UNITED STATES PATENT OFFICE.

GEORGE A. BURROUGH, OF PROVIDENCE, RHODE ISLAND, ASSIGNOR TO THE AMERICAN ENAMEL COMPANY.

IMPROVEMENT IN THE MANUFACTURE OF ENAMELED-METAL ARTICLES.

Specification forming part of Letters Patent No. 115,278, dated May 30, 1871; reissue No. 5,973, dated July 21, 1874; application filed July 11, 1874.

*To all whom it may concern:*

Be it known that I, GEORGE A. BURROUGH, of the city and county of Providence, in the State of Rhode Island, have invented or produced a new manufacture, which I term Enamel-Protected Pipe, Pipe-Fittings, &c., for conveying fluids or gases, or subjected to the action thereof; and I do hereby declare that the following is a full, clear, and exact description thereof:

My invention resides in the discovery that common iron or other pipes used for water or gas, and the fittings, couplings, and elbows used with the same, if coated with an emaneling composition and subjected to the action of sufficient heat to develop the composition into a tenacious, coherent, and moderately elastic and impervious coating will possess properties and qualities which especially adapt them for use in conveying water or other liquids or gases in cases where it is desirable that such pipes and fittings should not injuriously affect the fluid or gases conveyed by them. The invention is also applicable to the portions of pumps which are to be submerged.

The first operation is to thoroughly cleanse the pipes or fittings from all impurities by the use of alkalies or acids, and then washing them in clean water. After they are dried they are to be covered inside and out with a coating of enameling-composition, which is to be prepared and applied and developed under the action of heat, as more particularly specified in the Letters Patent granted to Charles L. Robertson, dated April 2, 1867, to which reference is to be had.

If one application of the enameling-composition is insufficient to thoroughly coat the surface of the pipes or fittings, the process described in said Letters Patent should be repeated until a surface covering of sufficient thickness has been obtained.

The result is that wrought-iron pipes—for example, which are unfit for distributing water in dwelling-houses—are rendered, after they have been protected as described, in every respect suitable for such use, and are more desirable on account of their great cheapness and complete protection against deleterious influence on the water than lead or tin-lined lead or tinned brass pipes.

Pipes and fittings so coated constitute a new manufacture, which enables an unsuitable material to be adapted to uses for which it was previously unfitted.

I do not mean to be understood as confining myself to the employment of a composition of the same elements in the same proportions described in said Robertson's patent, but any other composition of the same general character possessing the same qualities, and capable, when spread upon a surface and subjected to the action of a high artificial heat, of developing a tenacious and coherent coating, impervious to water, may be used.

What I claim as my invention, and desire to secure by Letters Patent of the United States as a new manufacture, is—

Pipe and pipe fittings and couplings for the conveyance of liquids or gases, or exposed to the action thereof, coated with an enameling-composition, substantially described, which, under artificial heat, is developed into a surface covering of the character substantially as specified.

GEO. A. BURROUGH.

Witnesses:
JOHN B. GRINNELL,
O. L. BOSWORTH.